United States Patent [19]

Reynolds et al.

[11] Patent Number: 4,921,231
[45] Date of Patent: May 1, 1990

[54] TORSION SPRING CARTRIDGE ASSEMBLY

[75] Inventors: Norman Reynolds, Franklin; Wilbur C. Reynolds, Muskego, both of Wis.

[73] Assignee: Reynolds Torsion System, Inc., Muskego, Wis.

[21] Appl. No.: 888,028

[22] Filed: Jul. 18, 1986

Related U.S. Application Data

[63] Continuation-in-part of Ser. No. 781,149, Aug. 14, 1985, abandoned.

[51] Int. Cl.⁵ ............................................. F16F 13/00
[52] U.S. Cl. ................................... 267/196; 267/154; 267/278; 280/700; 280/721; 280/789; 16/308
[58] Field of Search ............... 267/154, 278, 196, 198; 280/63, 664, 700, 721, 723, 789; 16/308

[56] References Cited

U.S. PATENT DOCUMENTS

| | | | |
|---|---|---|---|
| 1,338,556 | 4/1920 | Craig | 188/130 |
| 2,169,373 | 8/1939 | Porsche | 267/57 X |
| 2,606,020 | 8/1952 | Anderson | 267/57 |
| 2,662,236 | 12/1953 | Kester | 267/57 X |
| 2,779,602 | 1/1957 | Kimbro et al. | 267/57 X |
| 2,950,103 | 8/1960 | Ruf | 267/57 |
| 3,844,583 | 10/1974 | Sakow et al. | 267/57 X |
| 4,194,761 | 3/1980 | Falk et al. | 267/75 X |
| 4,544,180 | 10/1985 | Maru et al. | 280/721 X |
| 4,571,775 | 2/1986 | Leonard | 267/57 X |
| 4,580,808 | 4/1986 | Williams | 280/700 |

FOREIGN PATENT DOCUMENTS

| | | | |
|---|---|---|---|
| 235431 | 10/1959 | Australia | 267/57 |
| 743996 | 10/1932 | France | 267/9 R |
| 887888 | 1/1962 | United Kingdom | 267/57 |

Primary Examiner—George E. A. Halvosa
Attorney, Agent, or Firm—Foley & Lardner

[57] ABSTRACT

The torsion spring cartridge assembly disclosed herein is adaptable for use in practically any environment where oscillating motion is encountered. The assembly provides axle support for a rotating member as well as spring suspension for the axle. Dampeners can be provided to damp motion in one direction of oscillation or rotation. Serviceability is simplified since the entire assembly is removable for repair or replacement. The spring rate can be quickly and easily adjusted to accommodate environmental changes such as load, road conditions and weather. The torsion bars are protected from overstressing and possible distortion by a torsion limiter.

18 Claims, 3 Drawing Sheets

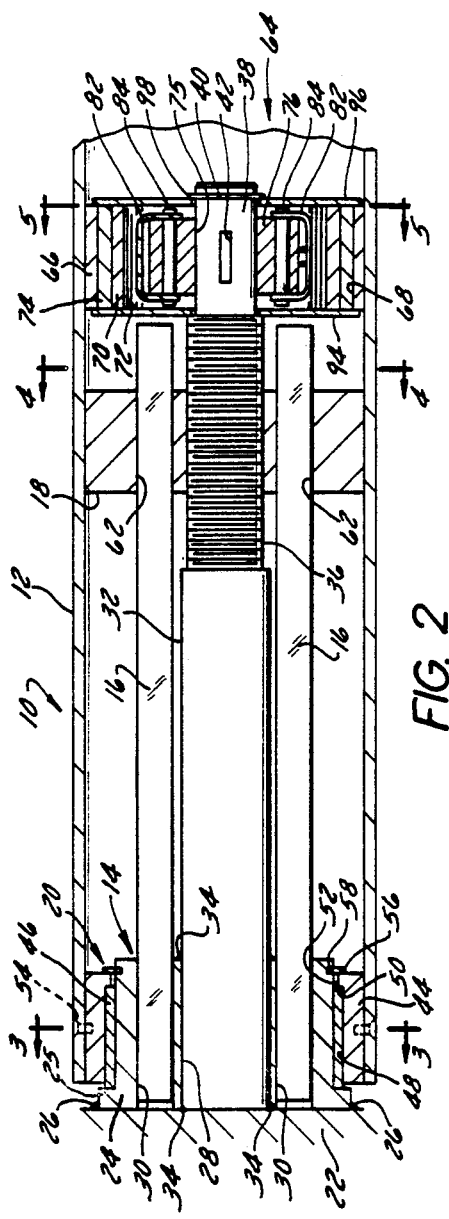
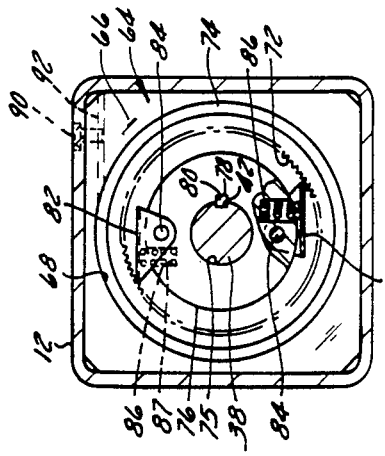
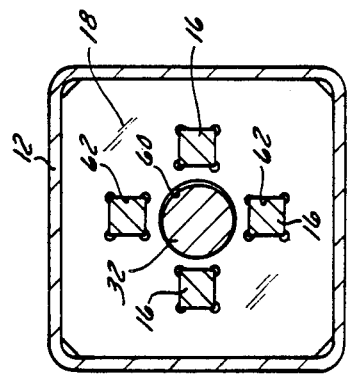
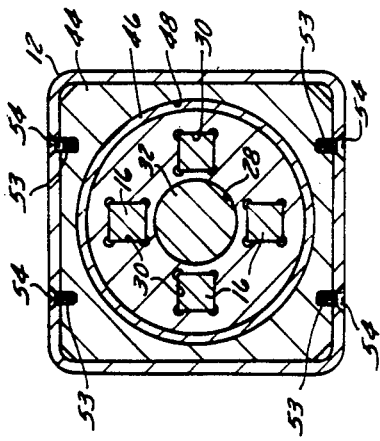
FIG. 2
FIG. 5
FIG. 4
FIG. 3

TORSION SPRING CARTRIDGE ASSEMBLY

RELATED APPLICATIONS

This application is a continuation in part of our earlier filed application, Ser. No. 781,149, filed on Aug. 14, 1985 and entitled "Torsion Spring Cartridge Assembly", now abandoned.

BACKGROUND OF THE INVENTION

Light or heavy-duty trailers require an energy absorbing system to support the frame and cargo from the wheels. This system is permanently mounted to the vehicular frame, which generally includes shock absorbers to dampen excessive spring action and vibrations. Serviceability of the system, whether replacement or repair, is a time-consuming and often expensive procedure. This is particularly true where major parts or the whole system requires replacement. Most axle systems require sufficient clearance from the vehicular frame for operation, which increases trailer height and resulting center of gravity. Because of this and the size required for proper operation, a significant amount of unsprung mass is present, contributing to inferior ride and control quality.

Manufactured homes that are road mobile have either an integral frame chassis or are carried on a special transporter. Both designs require three or more axles, especially the transporter as the finished home is heavier. Because of code requirements for proper travel, suspension system costs can become considerable. Integral frame homes rarely travel more than once, from point of manufacture to site location. Axles remain with the home and the tire and wheel assemblies are the only recoverable costs. Although the transporter is used repeatedly for home delivery, the system and tire wear is excessive on return trips.

Aside from vehicles, propeller shafts, like PTO (power take-off) shafts, are required to absorb and transmit high inertial and shock transient loads. Resulting loads are hard on entire drive line machinery. When failure does occur, rotating shaft damage can be excessive and severe. Absorption of transient loads allows for smoother and safer operation and reduced servicing costs.

SUMMARY OF THE INVENTION

The present invention relates generally to a torsion spring cartridge assembly which can be easily assembled and installed or removed from the trailer frame.

The cartridge assembly is in the form of a compact unit which can be simply and easily installed in each end of an axle tube. Each assembly is made up from four basic units, a bearing housing, a torque assembly, a counter-torque hub, a set of torsion bars which connect the torque assembly to the counter-torque hub and a torsion limiter. A dampening assembly may be added to the unit to absorb shock loads, if desired. Maintenance and repair is simplified since each cartridge assembly can be individually removed from the axle tube, and replaced or repaired as required. Another important advantage of the individual cartridge assemblies is the difference in weight compared to a conventional axle and suspension system. The difference can be as much as fifty percent.

IN THE FIGURES

FIG. 2 is a side elevation view of the torsion spring cartridge assembly shown positioned in the axle tube.

FIG. 3 is a view taken on line 3—3 of FIG. 2 showing the torque hub and bering assembly.

FIG. 4 is a view taken on line 4—4 of FIG. 2 showing the counter-torque hub.

FIG. 5 is a view taken on line 5—5 of FIG. 2 showing the dampening assembly.

FIG. 8 is a sectional side elevation view of a torsion spring cartridge assembly having a torsion limiter mounted on the torsion bars.

FIG. 9 is a view taken in line 9—9 of FIG. 8 showing the torsion limiter in the neutral position.

FIG. 10 is a view similar to FIG. 9 showing the torsion limiter in the limiting position.

DESCRIPTION OF THE INVENTION

Figure 1:
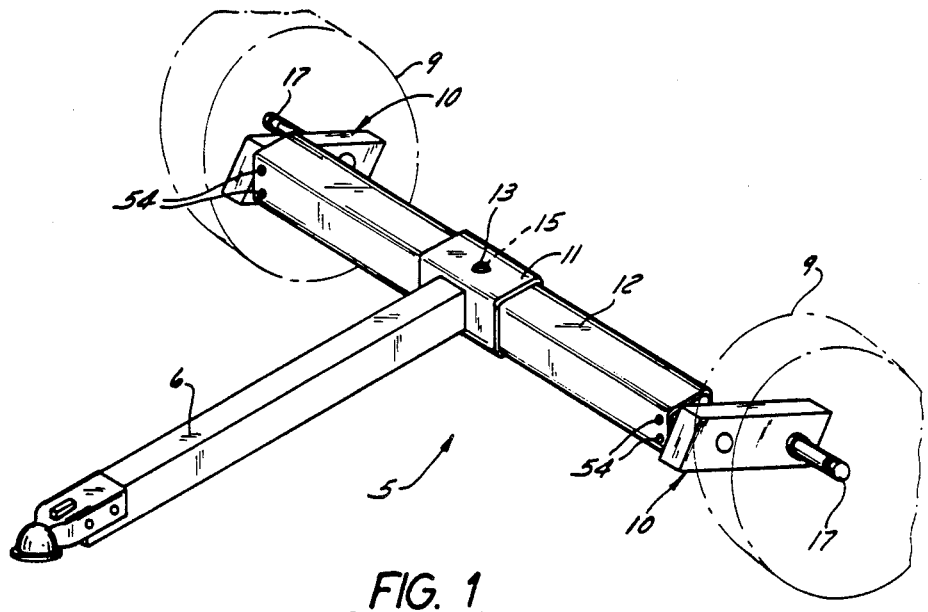
FIG. 1 is a perspective view of a simple trailer frame according to the invention installed in the axle tube.

A simple trailer frame 5 of a type contemplated for use of the invention herein is shown in FIG. 1 and includes a tubular steel tongue 6, an axle tube 12 mounted on the end of the tongue 6, a torsion spring cartridge assembly 10 according to the invention mounted on each end of axle tube 12 and a wheel 9 mounted on each of the torsion spring cartridge assemblies 10. The axle tube 12 is removably mounted on the end of the tongue 6 by means of a close fitting tubular member 11 welded to the end of the tongue 6. The tubular member 11 has the same inner dimension a the outer dimension of the axle tube 12. The member 11 and axle tube 12 are shown having a square configuration, however any other configuration can be used. The axle tube 12 is retained in the tubular member 11 by means of a carriage bolt 13 which passes through openings 15 in member 11 and corresponding holes (not shown) in the axle tube 12. The torsion spring cartridge assemblies 10 are retained in the ends of the axle tube 12 by means of bolts 54. Once assembled the wheels 9 can be mounted on the axle 17 provided on each of the cartridge assemblies 10. It should be apparent that each cartridge assembly is independently serviceable for repair or replacement.

The T-frame trailer described above is designed for light loads only such as required for boats, motorcycles, snowmobiles or light industrial applications. Trailers for heavier loads such as stock trailers, equipment trailers and travel trailers, generally include a supporting frame with one or more axle tubes secured to the frame. Each wheel is then independently supported in the axle tube and can be separately serviced, repaired or replaced. This is of particular significance to the mobile home industry where road codes require a permanent axle suspension system for road travel. Using independently removable torsion spring cartridge assemblies in permanently mounted axle tubes will allow removal of the cartridge assemblies from the axle tubes after the mobile home is set up for reuse by the mobile home manufacturer at a reduced cost for the owner and manufacturer.

TORSION BAR CARTRIDGE ASSEMBLY

As seen in FIG. 2 of the drawings, the torsion bar cartridge assembly 10 is mounted within the square axle tube 12. The assembly 10 generally includes a torque assembly 14, a plurality of torsion bars 16, a counter-torque hub 18 and a bearing assembly 20 for supporting said torque assembly for rotary motion with respect to the axle tube 12. The torsion bars 16 are supported at one end by said torque assembly 14 and are restrained from rotary motion by means of the counter-torque hub 18. It should be noted that these four elements make up the basic torsion spring assembly for one end of the axle tube and are inserted as a single cartridge or unit. With this arrangement serviceability of each cartridge assembly is simplified since each assembly can be separately removed for service, repair and/or replacement as will be more specifically described hereinafter.

THE TORQUE ASSEMBLY

The torque assembly 14 includes a torque member 22 connected to a torque hub 24 by any convenient means such as welds 26. The hub 24 includes a circular bore 28 and a number of square openings 30 spaced radially outward from the axis of the bore 28 at equal intervals. A radial flange 25 is provided at the outer end of the hub 24 and an annular groove 58 is provided at the inner end. A draw bar 32 is secured to the torque hub 24 by means of welds 34 and extends axially through the bore 28 into the tube 12. The draw bar 32 includes a threaded reduced diameter section 36 and a reduced diameter end section 38 having an axially extending groove 42 on the outer circumference. An annular groove 40 is provided at the end of the end section 38. The torque member 22 is representative of one of a number of members that can be used to connect the torque hub to an oscillating member.

The torque assembly 14 is supported in the end of the axle tube 12 by means of the bearing assembly 20. In this regard, the bearing assembly includes a housing 44 and a bearing 46. The housing has an outer configuration conforming to the configuration of the axial tube, in this case square, with a counter bore 48 which terminates at a shoulder 50 formed by means of an inner radial flange 52. A number of threaded holes 53 can be provided in the outer periphery of the housing 44. The bearing 46 is positioned in the bore 48 and abuts the shoulder 50. The housing 44 is retained in the axle tube 12 by means of a number of screws 54 screwed in holes 53. The torque hub 24 is supported in the housing 44 by the bearing 46 and is retained therein by a snap ring 56 positioned in the groove 58 in the hub 24.

The counter-torque hub 18 has an outer configuration also conforming to the inner configuration of the axle tube 12 and is provided with a center bore 60 and a number of square openings 62. The center bore 60 is threaded to operatively engage the threaded section 36 of the draw bar 32. The hub 18 is mounted on the draw bar by turning the hub on the threaded section 36 to a predetermined spaced postion with respect to the torque hub 24.

The torsion bars 16 are then inserted through the openings 62 in the counter-torque hub 18 into the openings 30 in the torque hub 24. The bars 16 are held in position in the openings 30 and 62 by means of a plate 94 as described hereinafter. Rotary motion of the torque member 22 will then be resisted by the counter-torque hub 18. It should be noted that the bias force of the bars 16 can be varied by adjusting the distance of the counter-torque hub 18 with respect to the hub 24. The torsion rods can be made of any resilient material from steel to fiberglass depending on the requirement of the particular application.

This is accomplished by removing the plate 94 and pulling the torsion bars 16 out of the openings 30 in the torque hub 24. The counter-torque hub 18 is rotated in one direction to move closer to the hub 24 and in the other direction to move the hub 18 farther away from the torque hub 24. Movement of the hub 18 closer to the hub 24 will increase the force required to rotate the torque arm and movement away will decrease the force. The torsion bars 16 are then reset in the openings 30, and the plate 94 mounted on the draw bar 32 in abutting engagement with the end of the section 38.

The counter torque hub 18 can be modified to move without moving the torsion bars 16 out of the torque hub 24. This is achieved by providing threaded holes in the hub 18 which terminated at the central bore 60. Set screws can be provided in the threaded holes to engage the draw bar. Slots corresponding to the threaded holes are provided in the axle tube. The set screw can be screwed into engagement with the draw bar through the slots in the axle tube. The hub has a central bore 60 which can be made larger than the diameter of section 36 on the draw bar to allow for free movement on the draw bar in the axle tube. The hub can then be moved axially within the limits of the slots in the axle tube and set in position by tightening the set screws against the draw bar.

TORSION LIMITER

Means can be provided in the axle tube 12 for limiting the rotary motion of the torque hub 24 to prevent overstressing and/or distortion of the torsion bars 16. Such means is in the form of a torsion limiter 23, FIGS. 8, 9 and 10, which is mounted to rotate on the draw bar 32 and is operatively connected to limit the extent of rotary motion of torsion bars 16. The limiter 23 is in the form of an eight-sided plate having holes 35 for the torsion bars 16 and a hole 33 for the draw bar 32. Four of the sides 37 are offset at an angle to matingly engage the inside walls of the axle tube when the limiter 23 rotates with the torsion bars 16.

In this regard, the limiter 23 is mounted on the draw bar 32 by passing the draw bar through the center hole 35 until the limiter 23 abuts the torque hub 24. The plate 23 is retained on the draw bar by means of a "C" ring 39 which is seated in a grove 41 in the draw bar. The torsion bars 16 are aligned with and extend through the holes 33. The limiter 23 will rotate with the hub 24 until the impact surfaces 37 engage the inside surface of the axle tube.

DAMPENING ASSEMBLY

Means can be provided on the end of the draw bar 32 to damp the return motion of the torque member 22. Such means is in the form of a dampening assembly 64. In this regard and referring to FIGS. 2 and 5, the dampening assembly 64 includes a housing 66 having an outer configuration conforming to the configuration of the axle tube and a center bore 68. A spline ring 70 having a series of teeth 72 around the inner diameter is supported in the bore 68 by means of an annular friction ring or pad 74. The friction ring 74 can be formed of a number of friction materials such as clutch brake band material (Raybestos-Manhattan material F451). A rotor 76 having a center bore 75 is mounted on the end section 38 of the draw bar inside of the spline ring 70. The rotor is secured to the draw bar by means of a key 78 positioned in the groove 42 in the end section 38 and a groove 80 provided in the bore 75 of the rotor 76.

The rotary movements of the rotor 76 are transferred to the spline ring 70 by means of a pair of pawls 82 mounted on diametrically opposite sides of the rotor 76. Each of the pawls is supported on the rotor by means of a pivot pin 84 and is biased radially outwardly by means of compression springs 86 positioned in blind bores 87 provided in the rotor 76. The pawls are positioned to engage the teeth 72 in the spline ring.

Referring to FIG. 5, it will be noted that the rotor 76 is free to rotate in a clockwise direction. Counterclockwise rotation of the rotor 76 is resisted by means of the engagement of the pawls 82 with the teeth 72 on the spline ring 70. On engagement of the pawls with the teeth 72, the spline ring will be forced to move in the counterclockwise direction. Rotary motion of the spline ring is resisted by means of the friction ring 74 provided between the spline ring and the bore 68 in the housing 66. In this regard, it should be noted that the spline ring includes 72 teeth spaced at 5 degree intervals. Any movement of less than 5 degrees will not be affected by the dampening assembly. As the amount of rotary motion increases in five degree increments a greater amount of dampening force will be introduced into the torque draw bar.

Means are provided for adjusting the frictional force of the friction ring 74. Such means is in the form of a screw 90 and a slot 92 provided in the housing 66. As the slot 92 is closed, the bore 68 will tighten on the ring 74 increasing the pressure on the spline ring 70.

The dampening assembly 64 is mounted on the end 38 of the draw bar 32 in abutting engagement with the Plate 94. The housing 66 is positioned against plate 94 and a second plate 96 is positioned on the end of the section 38 and retained thereon by a snap spring 98 positioned in groove 40. The spline ring 70 has a width slightly smaller than the width of housing 66 to allow for free movement between plates 94 and 96.

Figure 7:
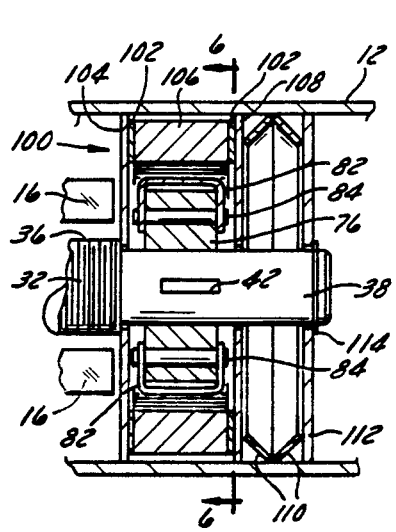
FIG. 7 is a cross-section view of the alternate dampening assembly taken on line 7—7 of FIG. 6.
Figure 6:
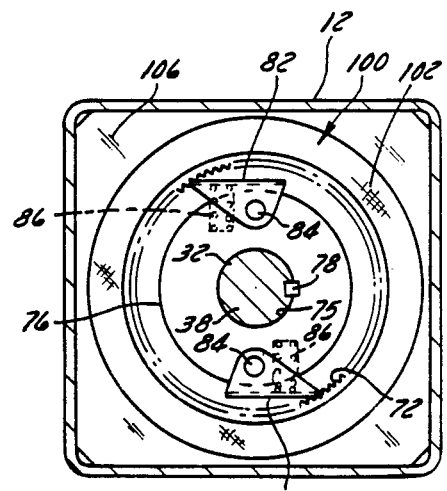
FIG. 6 is a view of an alternate form of dampening assembly.

An alternate dampening assembly 100 is shown in FIGS. 6 and 7 wherein the return motion of the torque arm 102 is dampened by means of radial friction pads 102. The dampening assembly 100 is mounted on the end section 38 of the draw bar 32 with a first square stator plate 104 abutting the end of the threaded section 36. A rotor 76, as described above, is mounted on the end section 38 with the pawls 82 biased outward by springs 86. A spline ring 106 having 72 teeth is placed on the rotor 76 with one of the friction pads 102 positioned between plate 104 and the spline ring 106. A second stator plate 108 is positioned in the axle tube with the other friction pad 102 located between plate 108 and ring 106.

The friction pads 102 are loaded by means of a pair of Belleville spring washers 110 positioned on the end of the shaft section 38 and retained thereon by a washer 112 and a snap ring 114 positioned in groove 40. The amount of friction force can be adjusted by adding washer 112 to the end of the shaft section 38. The dampener 40 operates in the same way as dampener 64 except that the friction force is applied axially rather than radially.

The transfer of motion from the rotor 76 to the spline rings 70 or 106 by the pawls 82 only representative of one of a number of systems for accomplishing this result. An overruning clutch or any other one-way transfer mechanism could be used for this purpose. The overrunning clutch would allow free wheeling on wind up of the torsion spring and would lock the friction dampener to the rotor on reverse motion.

The embodiment of the invention in which an exclusive property or privilege is claimed; are defined as follows:

1. A torsion spring cartridge assembly for an open ended axle tube, said cartridge assembly comprising
   a bearing assembly adapted to be removably mounted in a non-rotating relation in the open end of the axle tube,
   a torque assembly including a torque hub mounted for rotary motion in said bearing assembly and a draw bar having a screw thread at the inner end,
   a counter-torque hub adapted to be positioned in the axle tube in a spaced relation to said torque hub and in a non-rotating relation to the axle tube, said counter-torque hub including a threaded bore corresponding to said screw thread on said draw bar,
   two or more torsion bars connected between said torque hub and said counter-torque hub for biasing said torque assembly to a neutral position, said bearing assembly, torque assembly, torsion bars and counter-torque hub being removable as a unit from the axle tube for service, replacement or repair,
   whereby the distance between said torque hub and said counter-torque hub can be varied by rotating said counter-torque hub relative to said draw bar to change the bias force of said torsion bars.

2. The cartridge assembly according to claim 1, including
   means mounted in said axle tube connecting said axle tube to said draw bar for dampening the return motion of said torque assembly.

3. The cartridge assembly according to claim 2 wherein said dampening means comprises
   a housing,
   a bore in said housing,
   a friction ring positioned in said bore,
   a slip ring positioned in said friction ring,
   a rotor connected to said torque assembly and positioned in said slip ring,
   and means operatively connecting said rotor to said slip ring in one direction of motion, whereby the rotary motion of said torque assembly in said one direction is dampened by the frictional resistance of the friction ring to movement of said slip ring.

4. The assembly according to claim 3 wherein said dampening means includes
   means for adjusting the frictional resistance of the friction ring to movement of said slip ring.

5. The cartridge assembly according to claim 2 wherein said dampening means comprises
   a rotor operatively connected to said draw bar,
   a spline ring mounted on said rotor,
   means for operatively connecting said rotor to said spline ring in one direction of motion,
   and means for frictionally engaging said spline ring to dampen the motion of said rotor in said one direction of movement.

6. The cartridge assembly according to claim 1 wherein said torsion bars are spaced symmetrically about the axis of said torque assembly and said counter-torque hub.

7. The cartridge assembly according to claims 1, or 6, including means mounted on said torsion bars in a position to engage said housing for limiting the rotary motion of said torque assembly.

8. A torsion spring cartridge assembly for supporting a wheel on the end of an open ended square axle tube, said assembly comprising
   a bearing assembly having an outer configuration corresponding to the inner configuration of the axle tube and adapted to be mounted in the end of the axle tube,
   a torque assembly operably connected to the wheel and mounted for rotary motion in said bearing assembly,
   a counter-torque hub having an outer configuration corresponding to the inner configuration of the axle tube and adapted to be mounted in the axle tube in a spaced relation to the torque assembly, and two or more torsion bars
   connecting said torque assembly to said counter-torque hub whereby the rotary motion of the torque assembly is restricted by the counter-torque hub.

9. The assembly according to claim 8 including
   means connecting said torque assembly to said counter-torque hub whereby the distance of the counter-torque hub from the torque assembly can be adjusted to vary the spring rate of the torsion bars.

10. The assembly according to claim 8 including
    means mounted in said axle tube for dampening the rotary motion of said torque assembly.

11. The assembly according to claim 10 wherein said dampening means includes
    a housing having an outer configuration conforming to the inner configuration of said axle tube,
    a spline ring,
    a rotor mounted in said spline ring and operatively connected to said torque assembly,
    means on said rotor for engaging said spline ring in one direction of motion, and
    friction means positioned to resist rotary motion of said spline ring.

12. The assembly according to claim 11 wherein said friction means comprise an annular friction pad mounted between said spline ring and said housing.

13. The assembly according to claim 11 wherein said friction means comprises a radial friction pad mounted on each side of said spline ring and
    means for biasing said pads into engagement with the sides of said spline ring.

14. The assembly according to claim 8, including means for limiting the rotary motion of the torque assembly.

15. A cartridge-type torsion spring unit that can be removably mounted in the end of a square axle tube, said unit comprising
    a bearing assembly,
    a torque hub supported for rotary motion in said bearing assembly,
    a torque member connected to said torque hub, said torque member being adapted to be connected to an oscillating member,
    a draw bar connected to said torque hub,
    a counter-torque hub mounted on said draw bar in a spaced relation to said torque hub,
    said draw bar being rotatable with respect to the said counter-torque hub to vary the spaced relation betwen said counter-torque hub and said torque hub,
    a number of torsion bars connecting said torque hub to said counter-torque hub, and
    a torsion limiter mounted for rotary motion on said draw bar and operatively connected to said torsion bars for limiting the motion of said torque assembly, and
    said limiter comprising a square plate having a portion of each corner cut off whereby said plate will rotate with the torsion bars within the limits of the cut off corners.

16. The unit according to claim 15 wherein said counter-torque hub is movable on said draw bar to vary the spring rate of said torsion bars.

17. The unit according to claim 15 or 16 including
    dampening means mounted on said draw bar and being operatively positioned to engage said axle tube to dampen the rotary motion of the torque hub.

18. The unit according to claim 17 wherein said dampening means comprises
    a spline ring,
    a rotor mounted on said draw bar within said spline ring,
    means for connecting said rotor to said spline ring in one direction of motion,
    and friction means positioned to resist movement of said spline ring.

\* \* \* \* \*

UNITED STATES PATENT AND TRADEMARK OFFICE
CERTIFICATE OF CORRECTION

PATENT NO. : 4,921,231
DATED : May 1, 1990
INVENTOR(S) : Norman Reynolds and Wilbur C. Reynolds It is certified that error appears in the above—identified patent and that said Letters Patent is hereby corrected as shown below:

The sheet of drawing consisting of Figs. 8,9 and 10, should be added as shown on the attached page.

Signed and Sealed this

Tenth Day of March, 1992

Attest:

HARRY F. MANBECK, JR.

Attesting Officer

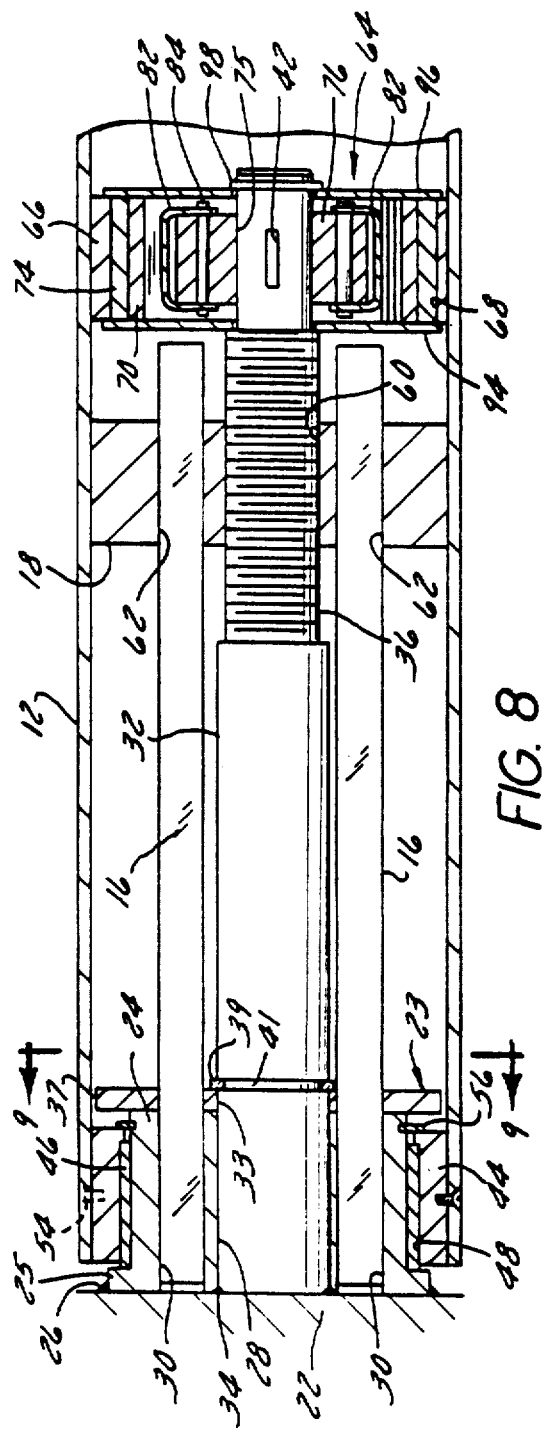
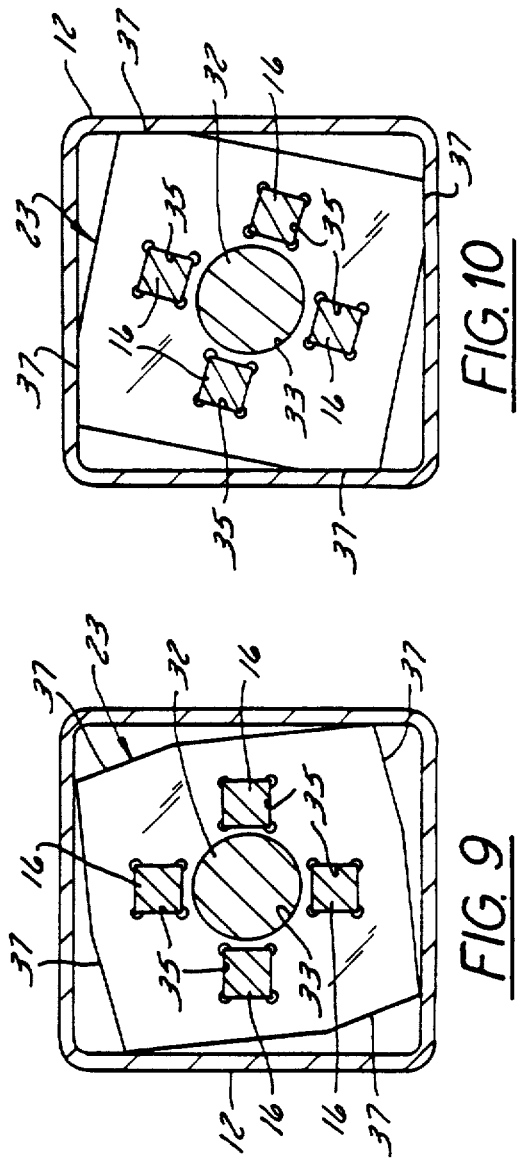

Commissioner of Patents and Trademarks